US012409669B2

(12) United States Patent
Bryant et al.

(10) Patent No.: US 12,409,669 B2
(45) Date of Patent: Sep. 9, 2025

(54) LINE PRINTER HAVING USER REPLACEABLE PLATEN ROLLERS

(71) Applicant: Toshiba TEC Kabushiki Kaisha, Shinagawa-ku (JP)

(72) Inventors: Donn Bryant, Lexington, KY (US); William Connors, Lake Forest, CA (US); Michael Lawrence, Lexington, KY (US); Brad Towe, Versailles, KY (US)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 66 days.

(21) Appl. No.: 18/370,673

(22) Filed: Sep. 20, 2023

(65) Prior Publication Data

US 2025/0091366 A1 Mar. 20, 2025

(51) Int. Cl.

| | |
|---|---|
| ***B41J 11/04*** | (2006.01) |
| ***B41J 3/407*** | (2006.01) |
| ***B65H 16/02*** | (2006.01) |
| ***B65H 20/02*** | (2006.01) |

(52) U.S. Cl.

CPC ............. *B41J 11/04* (2013.01); *B41J 3/4075* (2013.01); *B65H 16/02* (2013.01); *B65H 20/02* (2013.01); *B65H 2402/30* (2013.01); *B65H 2404/1431* (2013.01); *B65H 2404/17* (2013.01); *B65H 2601/273* (2013.01); *B65H 2601/324* (2013.01); *B65H 2701/1722* (2013.01); *B65H 2701/192* (2013.01)

(58) Field of Classification Search

CPC ........ B41J 11/04; B41J 15/042; B41J 3/4075; B41J 11/06; B41J 11/08; B41J 11/02; B41J 11/053; B41J 11/057; B41J 11/10; B41J 11/13; B65H 16/02; B65H 20/02; B65H 2601/273; B65H 2601/324; B65H 2402/30; B65H 2404/1431; B65H 2404/17; B65H 2701/1722; B65H 2701/192

See application file for complete search history.

(56) References Cited

U.S. PATENT DOCUMENTS

| | | | | |
|---|---|---|---|---|
| 7,699,550 | B2 * | 4/2010 | Bouverie ............. | B41J 11/0095 347/213 |
| 2010/0319561 | A1 * | 12/2010 | Colquitt ................... | B41J 2/325 101/477 |
| 2014/0160219 | A1 * | 6/2014 | Tobin ..................... | B65H 16/06 347/222 |
| 2016/0059588 | A1 * | 3/2016 | Aizawa ...................... | B41J 2/32 347/220 |

* cited by examiner

*Primary Examiner* — Kristal Feggins
(74) *Attorney, Agent, or Firm* — Kim & Stewart LLP

(57) ABSTRACT

A system and method for user friendly replacement of printer platen rolls includes a roll assembly having a support shaft with a bearing seated in a flange at one end. A crescent notch in a printer chassis receives the shaft into an interior of the notch. The assembly is moved axially so that a flange neck nests in the notch with a flange lip contacting a surface of the chassis. A lock contacts the lip to prevent axial motion of the assembly when installed. An opposed side of the shaft is placed in a bearing on an opposite side of the chassis.

20 Claims, 10 Drawing Sheets

LINE PRINTER HAVING USER REPLACEABLE PLATEN ROLLERS

TECHNICAL FIELD OF THE INVENTION

This application relates generally to a printer feed mechanism for printing a web stock, such as lined or liner-less labels. The application relates more particularly to a media feed system with platen rollers that can easily be replaced by end users without involving a repair technician.

BACKGROUND OF THE INVENTION

In-line printers function to print on a continuous web of print stock, such as label stock. Label printers typically print indicia, such as mailing addresses, onto a label that has adhesive on one side. More recently, liner-less label printing stock is being used.

In-line printing may be accomplished by ink or toner deposition. Direct or indirect thermal printing, as well as impact printing, may also be used. Printing is done on one side for lined adhesive label stock. More recently, printing can be done on both sides using unlined label stock. Dual sided printing uses upper and lower print heads and requires web movement by use of one or more platen roll assembly, such as a top assembly and a bottom assembly.

In-line printers are complex devices with mechanical components that are subject to wear and tear. This is particularly true in high throughput printing operations, such as those used in printing commercial labels. Over time, components may need to be replaced, typically by a qualified technician. This process adds to repair expense, as well as inconvenient downtime until repair is completed.

One component subject to period replacement is a platen roller. A platen roller is a fundamental component found in various types of printers, including dot matrix, impact, thermal, and label printers. Its primary role is to aid in paper or label handling and ensure accurate paper positioning during the printing process.

The platen roller serves several essential functions. Firstly, it assists in feeding paper or labels through the printer by rotating and advancing them past the printhead or printing mechanism. Secondly, it helps maintain the right amount of tension on the paper or label, preventing paper jams and ensuring consistent printing. Additionally, the platen roller plays a critical role in positioning the paper accurately in relation to the printhead, ensuring precise text and graphics placement on the printed material.

In impact printers like dot matrix printers, the platen roller provides a solid surface against which the printhead strikes, enabling the transfer of ink or impact force onto the paper to create characters and images. In thermal printers, the platen roller may include a heating element. When thermal paper passes over the heated platen, it activates chemicals on the paper, resulting in the production of images and text.

Overall, the platen roller is essential for ensuring the smooth and accurate operation of a printer by facilitating paper or label movement, maintaining tension, and assisting in precise printing. It serves as a critical component in various printing technologies, both impact and non-impact.

Replacing the platen roll often involves disassembling parts of the printer, including removing the printer cover, access panels, and other components. Often times specific tools are required to complete the operation. Technicians know the correct order and method for disassembly and replacement to avoid damage to the printer or injury.

BRIEF DESCRIPTION OF THE DRAWINGS

Various embodiments will become better understood with regard to the following description, appended claims and accompanying drawings wherein:

DETAILED DESCRIPTION OF THE INVENTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

While example embodiments herein are directed replacement of platen rollers in dual inline printers, it is understood that the structure and methods described herein can be applied to any replaceable roller in any printer type.

Figure 1:
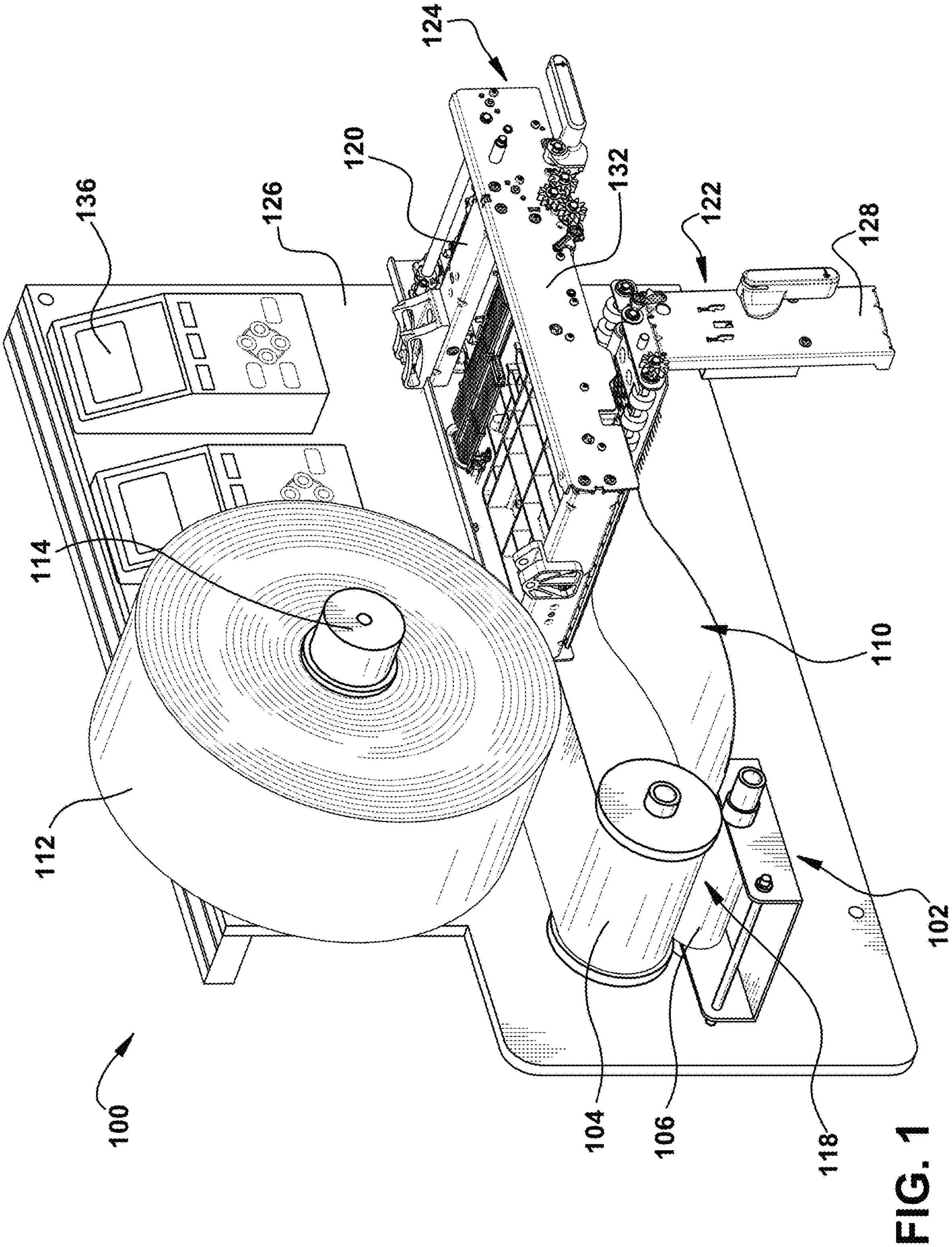
FIG. 1 is an example embodiment of a print system with user replaceable platen rolls.

In accordance with the subject application, FIG. 1 illustrates an example embodiment of a liner-less print system 100 with user replaceable platen rolls. The liner-less print system 100 includes a pre-feed mechanism 102 comprising a powered drive roller 104 and an idler roller 106. A reel 112 of liner-less labels 110 is mounted on a rotatable spindle 114. Liner-less labels 110 from the reel 112 are threaded through the nip 118 between the powered drive roller 104 and the idler roller 106. The powered drive roller 104 is comprised of rubber or another similar material configured to contact the printable top surface of the liner-less labels 110. Idler roller 106 advantageously is comprised of silicone or another similar material configured to contact the bottom surface of the liner-less label 110 without adhering to or sticking to the adhesive material on the bottom surface of the liner-less label 110.

The drive roller 104 and idler roller 106 pass the liner-less labels 110 to the in-line printer 120. The liner-less labels 110 are pulled into dual sided, in-line printer 120 at a consistent rate, indicia are printed on one or both sides of the liner-less labels 110, and the label is cut to size by an associated finisher in the in-line printer 120. In-line printer 120 is comprised of a lower printing assembly 122 for printing on a bottom surface of label stock and upper printing assembly 124 for printing on a bottom surface of label stock. Lower printing assembly 122 is secured to wall 126 so as to form a support chassis with support 128. Upper printing assembly 124 is secured to wall 126 to form a support chassis with support 132. Operation of print system 100 is suitably controlled by one or more intelligent controllers, such as intelligent controller 136.

The liner-less labels 110 can include a printable top surface configured to accept address indicia associated with a shipping label and a bottom surface that includes adhesive. In embodiments, the adhesive is disposed over only a certain portion of the bottom surface, for example around the edges, leaving a second printable area for accepting additional printed indicia such as invoice information for the end customer. In these embodiments, the consumer can remove the label from a received shipment to view the printed indicia on the bottom surface of a liner-less label 110.

Figure 2:
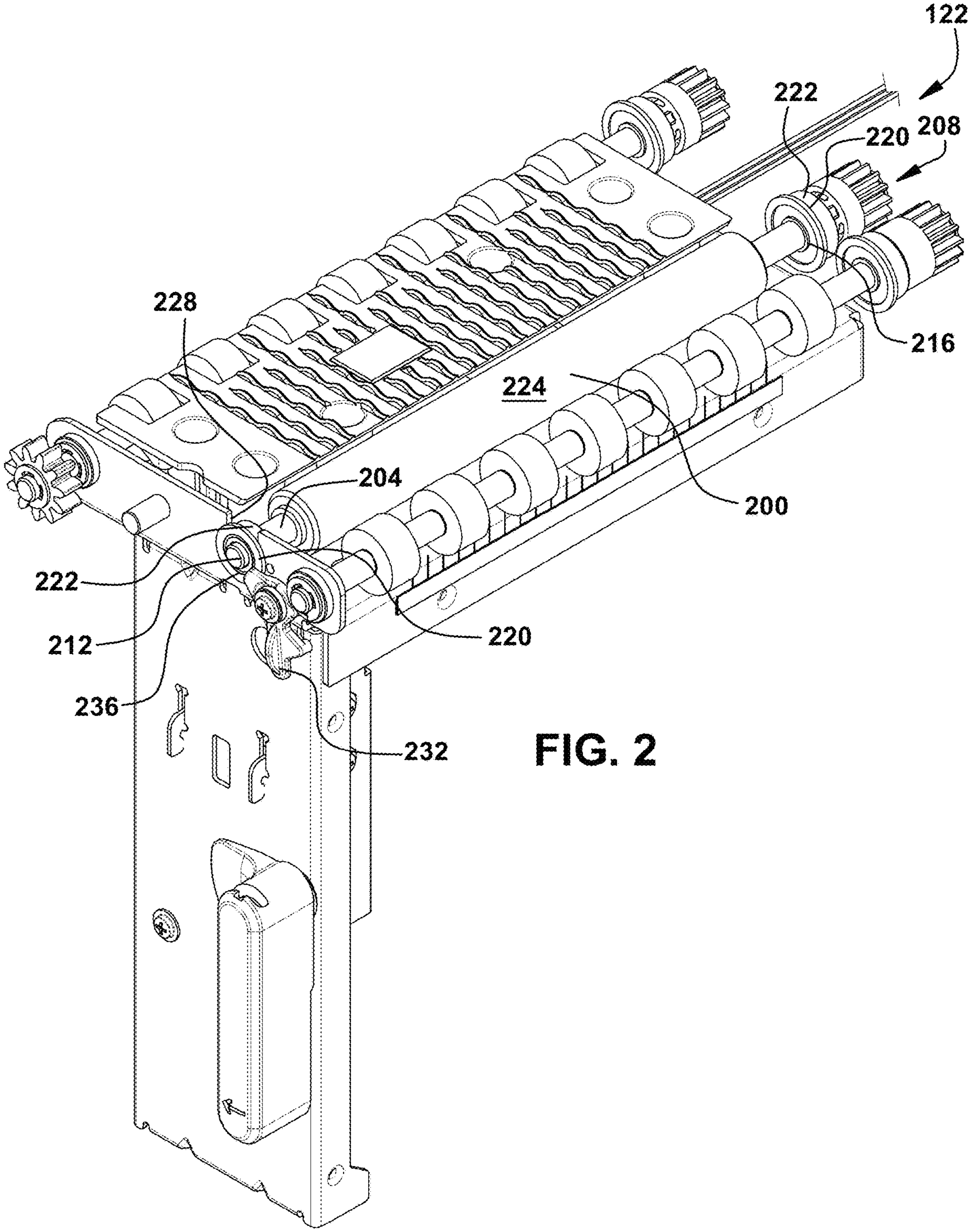
FIG. 2 is a perspective view of lower printing assembly 122 of FIG. 1.

FIG. 2 is a perspective view of lower printing assembly 122 of FIG. 1. Included is lower platen roll assembly 200 that includes support shaft 204 having distal end 208 and a distal end 212. Distal end 208 is placed into an inner race 216 of bearing 220. Bearing 220 nests in an interior of flange 222. Distal end 212 is rotatably connected to bearing 220 in its inner race. Bearing 220 is nested into an interior of flange 222. Shaft 204 supports radially extending, cylindrical printer platen roll 224. Flange 222 is pressed into a suitably sized and shaped notch 228, which can be a crescent notch. While example embodiments herein may refer to a standard bearing seated in a flange neck, it is to be understood that a bearing having a flange integrated into its outer race is also suitably used.

Crescent notch, as used herein, is directed to a notch or opening in a wall or any other barrier that allows something of a smaller diameter to pass through while preventing something of a larger diameter from doing so. In this context, the term may refers to a shape of the opening, which resembles a crescent moon, and its specific function as a selective or restrictive passageway. Latch 232 selectively contacts lip 236 of flange 222 to prevent or allow axial movement of flange 222 relative to notch 228.

Figure 3:
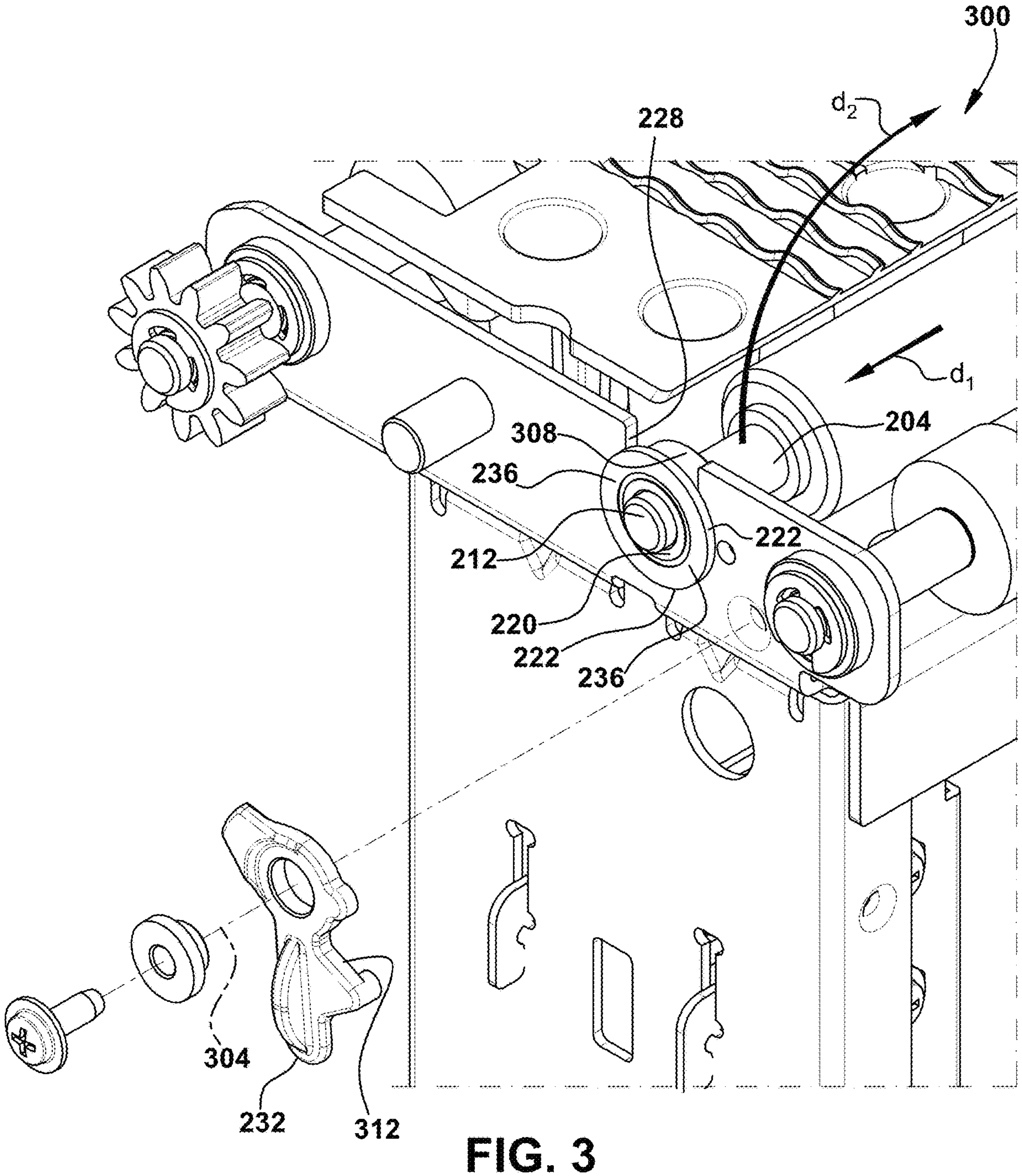
FIG. 3 is an expanded view of distal end 212 portion 300 of lower printing assembly 122 of FIGS. 1 and 2.

FIG. 3 is an expanded view of distal end 212 showing a platen roll assembly 300 of lower printing assembly 122. Removal of platen roll assembly from support 128 is accomplished by opening latch 232 by moving it pivotally via its support axis 304, removing it from contact with lip 236. Opening the latch enables movement of platen roll assembly 200 in axial direction $d_1$ removing flange neck 308 from notch 228 while positioning shaft 204 within the notch. A smaller diameter of shaft 204 allows for passage through an opening of notch 228 by arcuate direction $d_2$ that includes a radial movement component. Once the assembly is removed, a replacement assembly is added in a complementary fashion. That is, distal end 208 of the replacement assembly is placed in inner race 216 of bearing 220, the assembly is rotated so that the shaft at distal end 212 passes through notch 228. Once placed, the assembly is moved axially to nest the flange neck 308 in the notch, and the flange is locked in via rotation and securement of latch 232. Latch 232 suitably includes a stop 312 that positions the latch in its locking position.

In example embodiments, platen roll assembly 300 may be sold as a replacement unit comprised of the shaft and platen roller, with a flange nesting a bearing affixed to one end. In other example embodiments, the flange or bearing may be reusable.

Figure 4A:
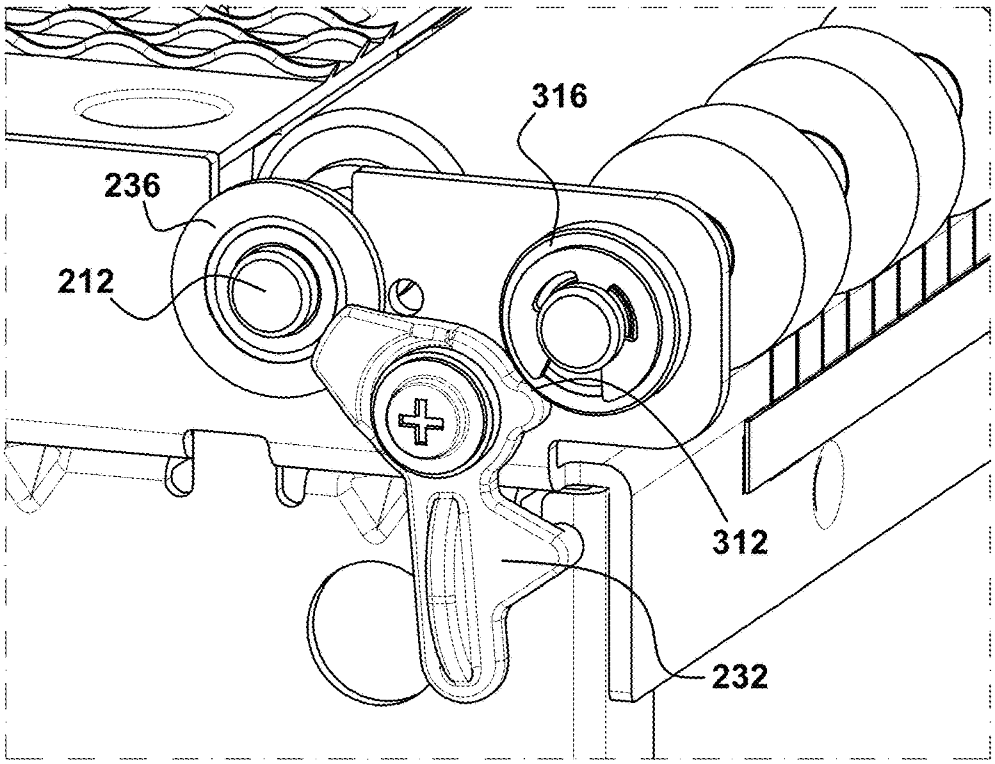
FIG. 4A is an expanded view of FIG. 3 showing a latch a in a lock position.
Figure 4B:
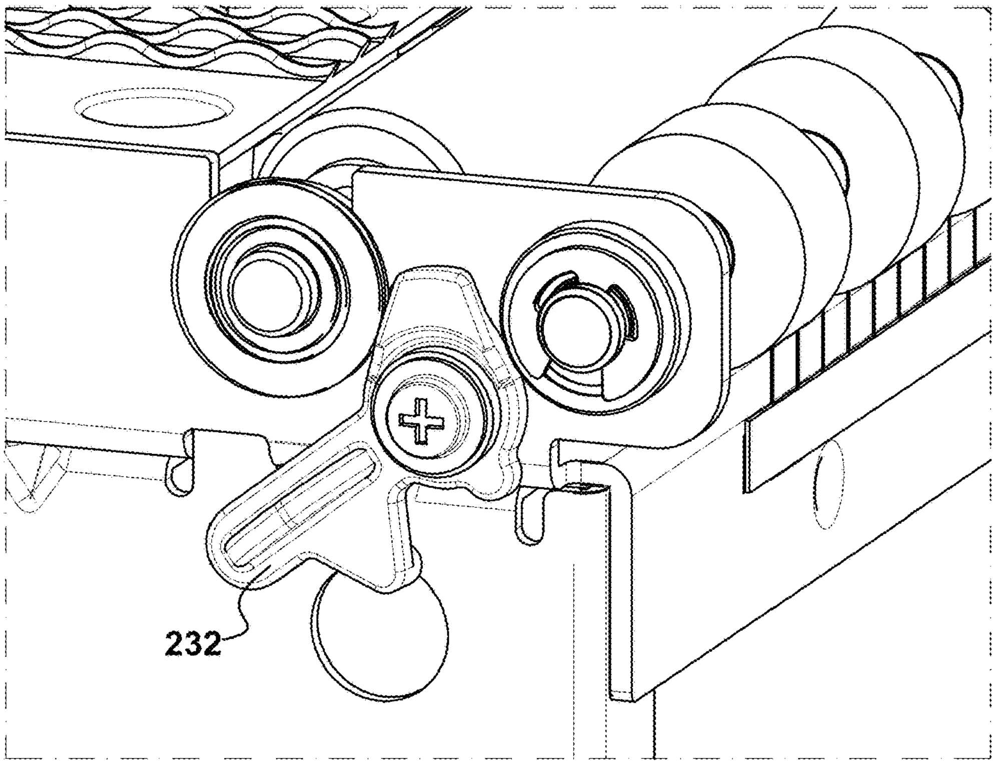
FIG. 4B is an expanded view of FIG. 3 showing a latch in an unlocked position.

FIG. 4A is an expanded view of distal end of platen roll assembly 300 showing latch 232 in a lock position by contacting flange lip 236. A locked position is coupled with stop 312 in contact with a secondary assembly 316. FIG. 4B is an expanded view of distal end of platen roll assembly 300 showing latch 232 in an unlocked position, allowing for removal and replacement of the print roll assembly.

Figure 5:
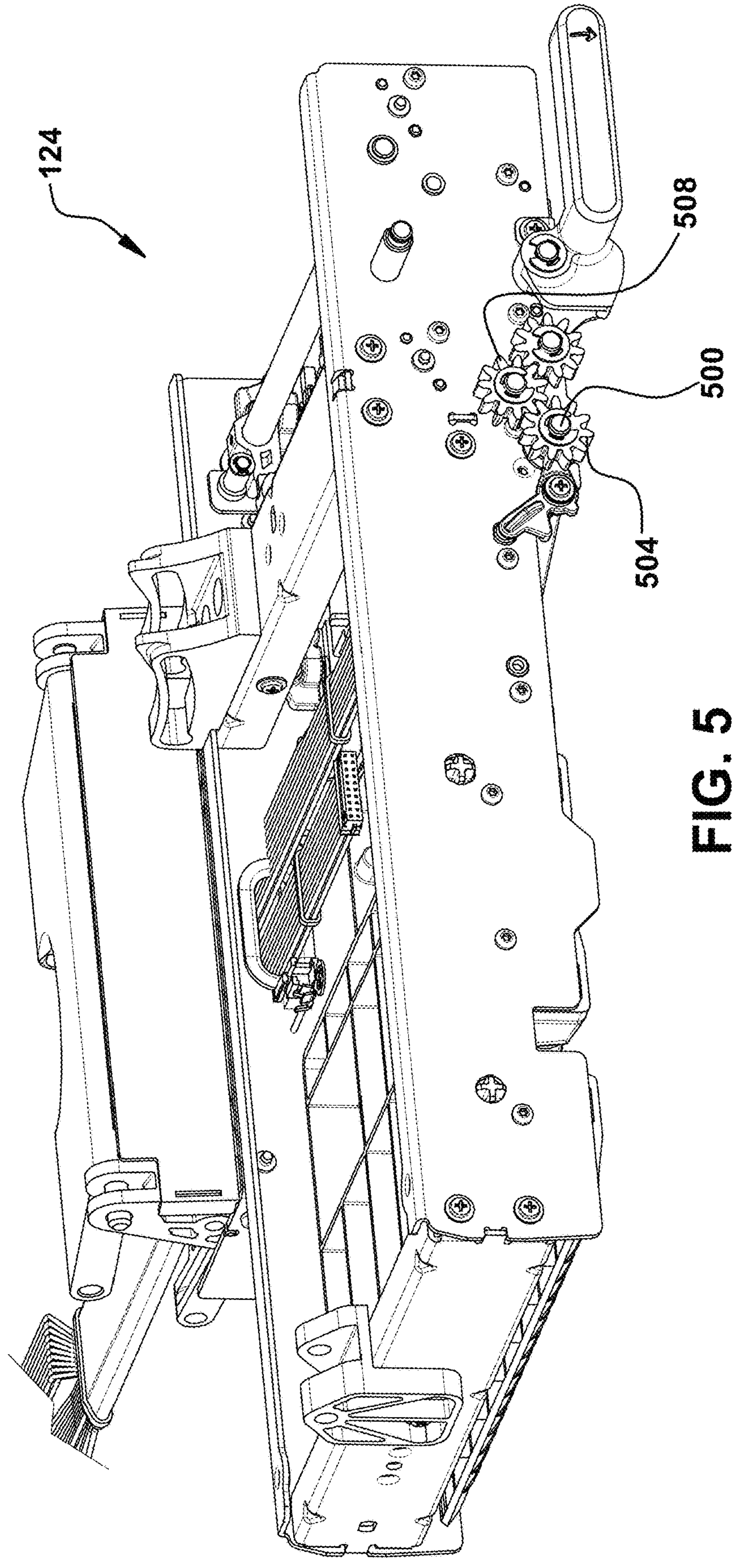
FIG. 5 is a top perspective view of the upper printing assembly of FIG. 1.

FIG. 5 is a top perspective view of upper printing assembly 124 of FIG. 1. Included is an upper printing roll assembly 500 that includes an affixed follower gear 504 configured to be actively driven for rotation by one or more drive gear, such as drive gear 508.

Figure 6:
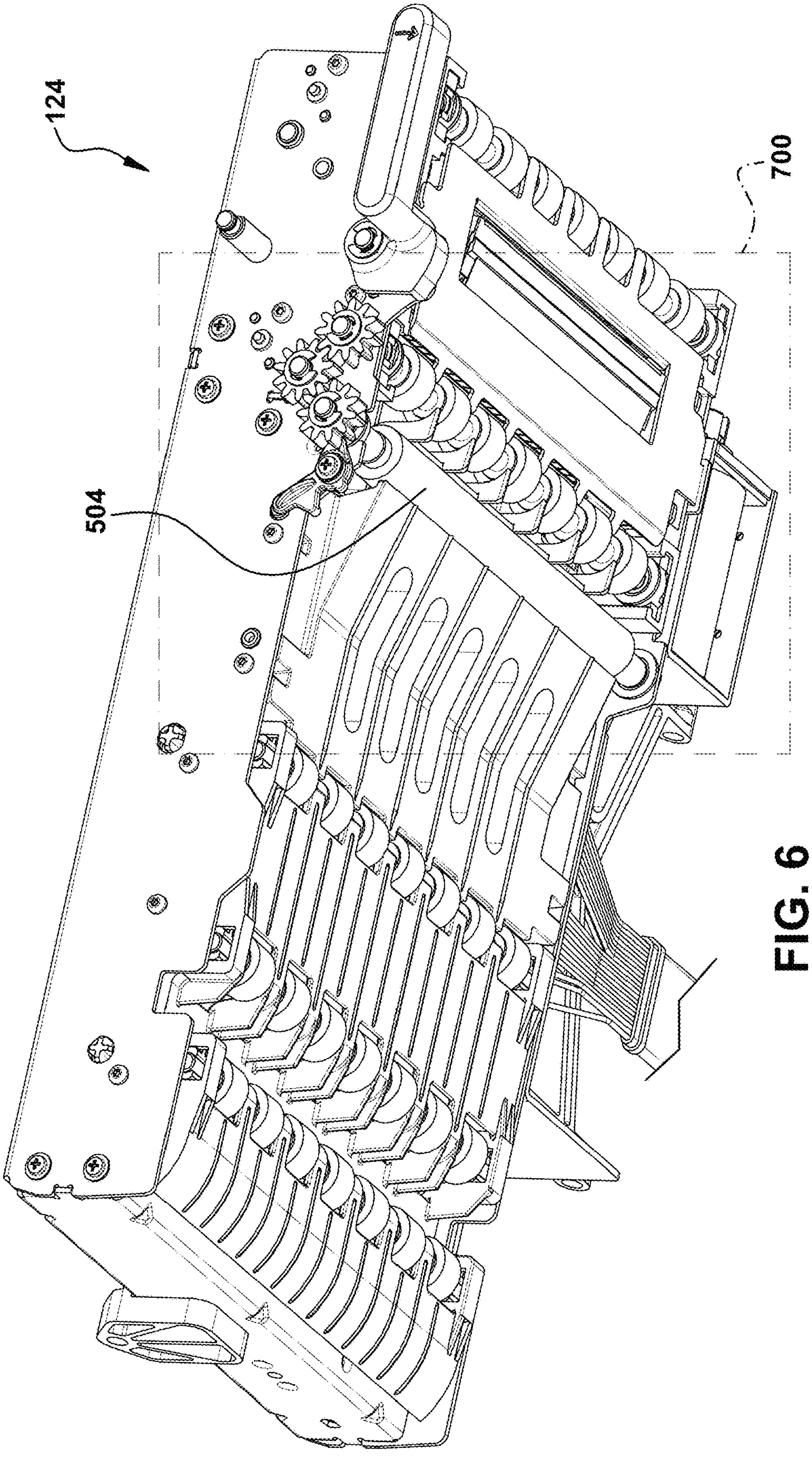
FIG. 6 is a bottom perspective view of the upper printing assembly of FIG. 1

FIG. 6 is a bottom perspective view of upper printing assembly 124 of FIG. 1 showing a view of upper printing roll assembly 500.

Figure 7:
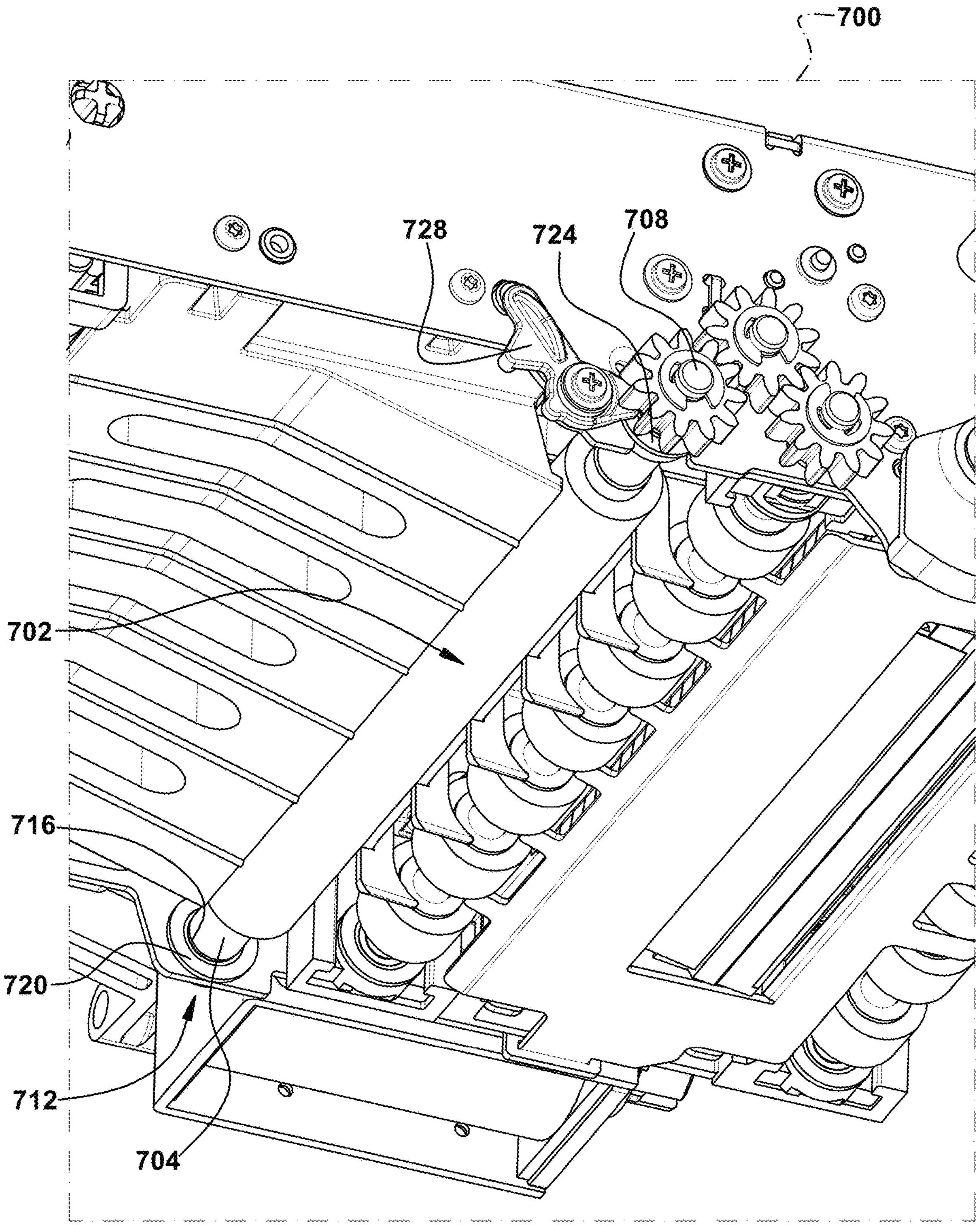
FIG. 7 is a further expanded view of box area 700 of FIG. 6.

FIG. 7 is a further expanded view of box area 700 of FIG. 6. Included is upper platen roll assembly 702 that includes support shaft 704 having distal end 708 and distal end 712. Distal end 712 includes inner race 716 of bearing 720 support shaft 704, analogously to the description for lower platen roll assembly 400 as detailed above. Additionally, at the distal end 708 a flange/bearing support 724 is configured analogously to that of lower platen roll assembly 400 as detailed above. In the illustrated embodiment, latch 728 is configured to selectively contact a flange lip of the assembly to secure it from axial movement during printer operation, analogously to latch 232 of lower platen roll assembly 400 as detailed above.

Figure 8A:
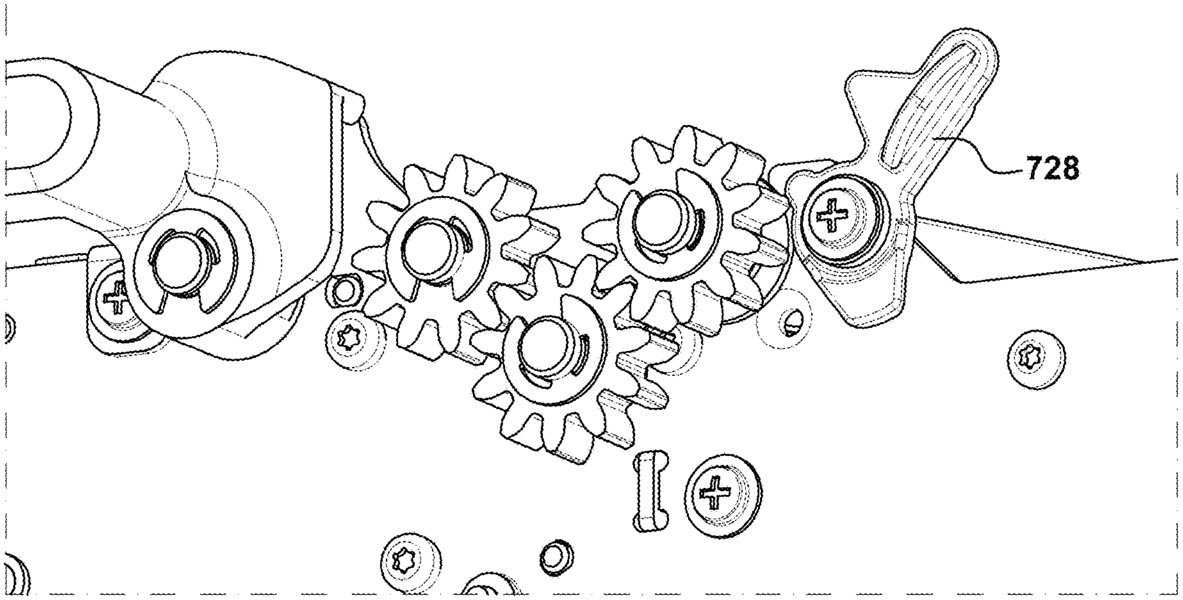
FIG. 8A is an expanded view of FIG. 7 showing a latch in an unlock position.
Figure 8B:
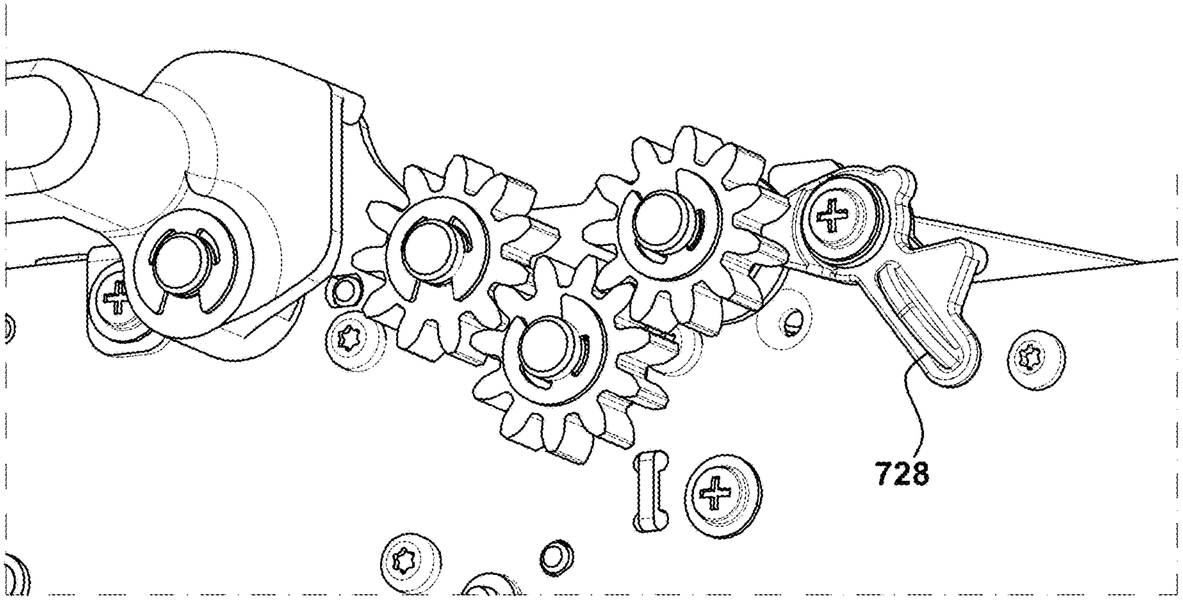
FIG. 8B is an expanded view of FIG. 7 showing the latch of in a lock position.

FIGS. 8A and 8B show latch 728 in an open position and a locked position, respectively.

Figure 9A:
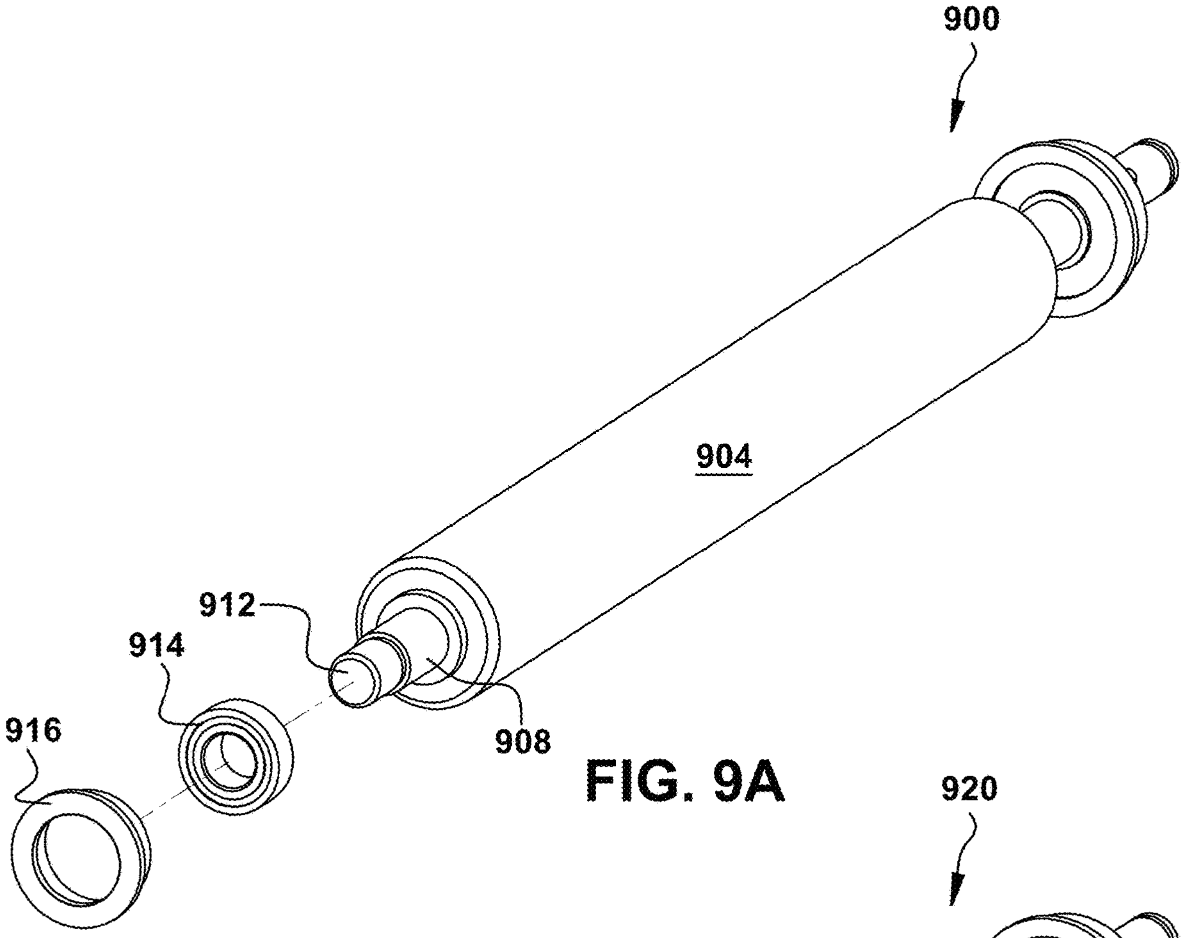
FIG. 9A is an exploded view of an example embodiment of a platen roll assembly.

FIG. 9A is an exploded view of an example embodiment of a platen roll assembly 900 suitably comprising a platen roll in lower printing assembly 122 or upper printing assembly 124. Included is platen roll 904 supported by coaxial shaft 908 having distal end 912. Distal end 912 is configured to receive flange 916 and bearing 914, nested as shown.

Figure 9B:
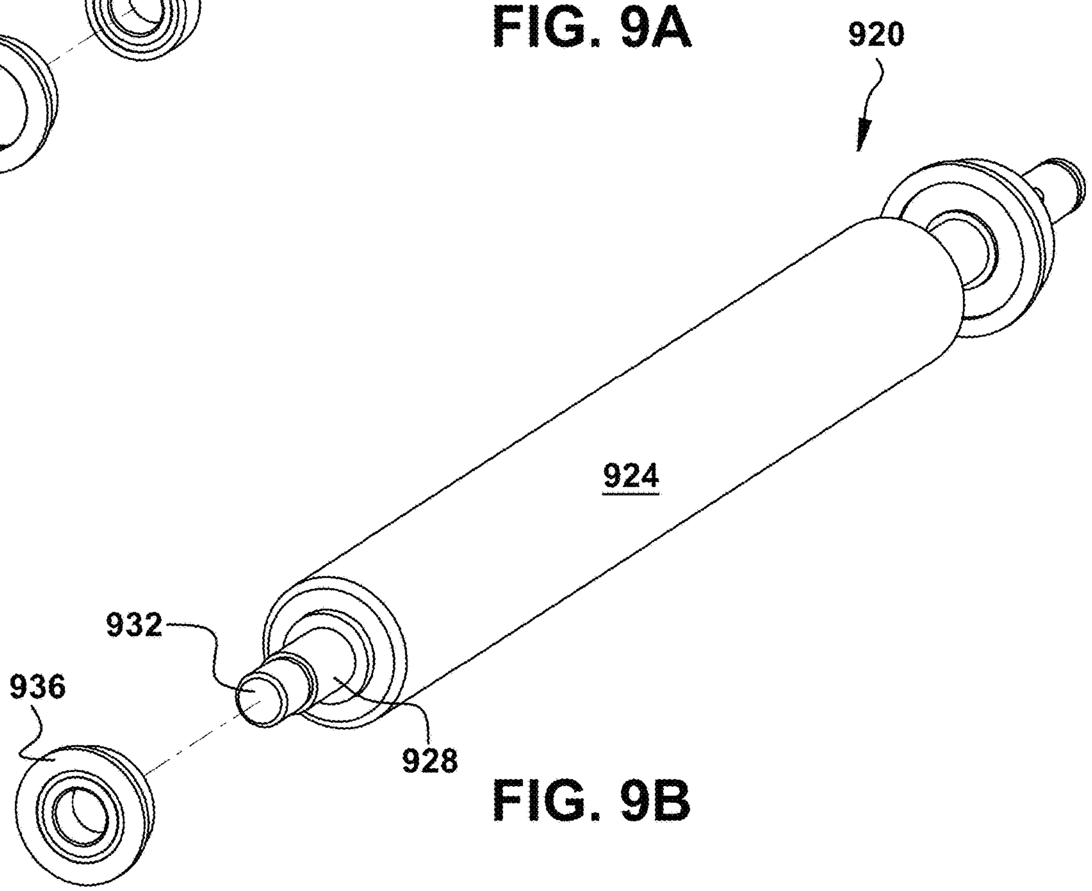
FIG. 9B is an exploded view of another example embodiment of a platen roll assembly.

FIG. 9B is an exploded view of another example embodiment of a platen roll assembly 920 suitably comprising a platen roll in lower printing assembly 122 or upper printing assembly 124. Included is platen roll 924 supported by coaxial shaft 928 having distal end 932. Distal end 912 is configured to receive flanged bearing 936 as shown.

Figure 10:
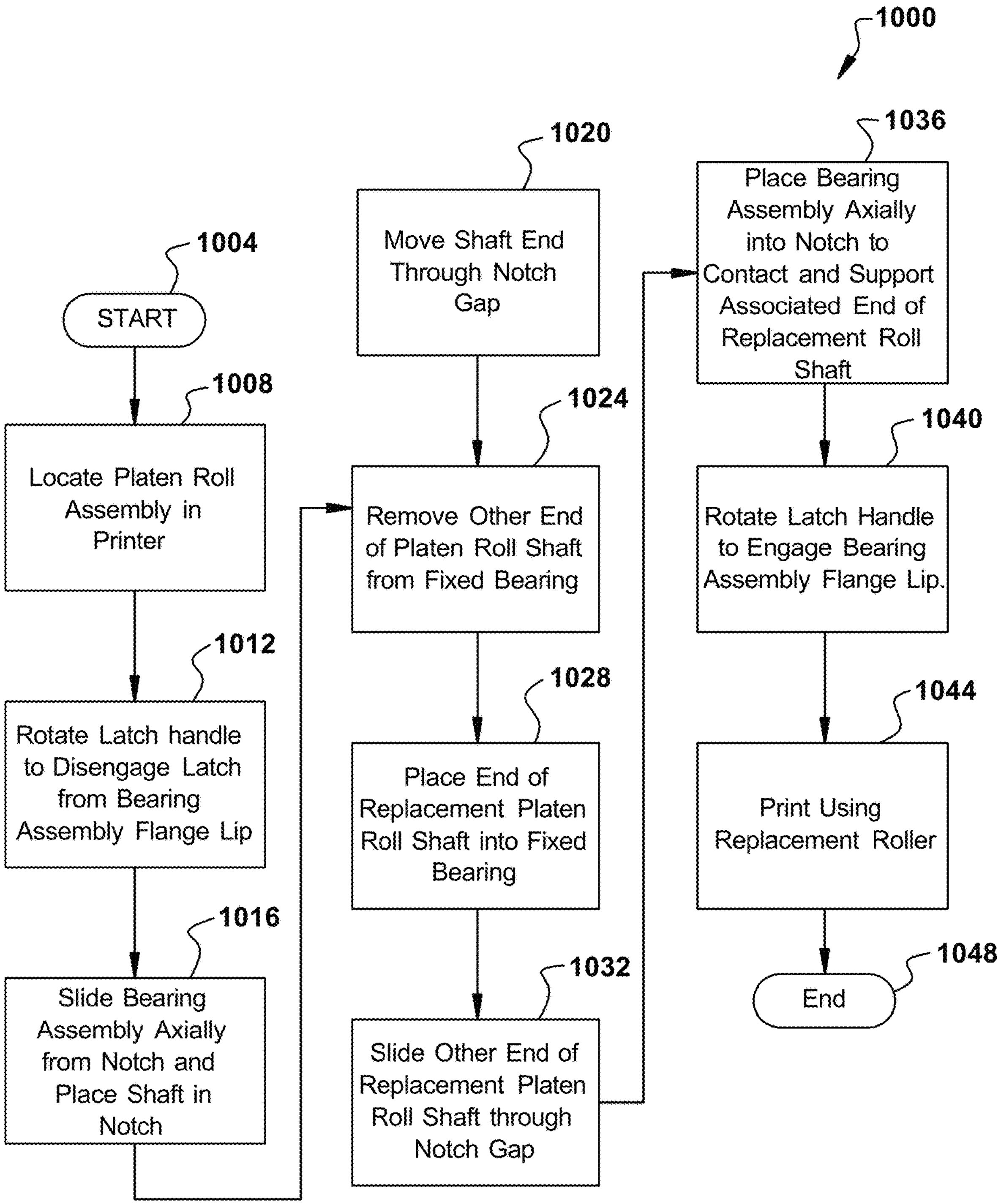
FIG. 10 illustrates a flowchart of an example embodiment of a method for user friendly replacement of a platen roll assembly.

FIG. 10 illustrates flowchart 1000 of an example embodiment of a method for user friendly replacement of a platen roll assembly. The process commences at block 1004 and proceeds to block 1008 where a user commences a roller assembly removal operation by locating a platen roll assembly in a printer. Next, at block 1012, the user rotates a latch handle to disengage the latch from a bearing assembly flange lip. The bearing assembly is then slid axially from a notch, placing an exposed shaft portion to the notch at block 1016. The exposed shaft is removed from the notch though its gap at block 1020, and the other end of the shaft is removed from its fixed bearing seat at block 1024.

A platen roller replacement installation commences at block 1028 where a user place an end of a replacement platen roll shaft into the fixed bearing. The other end of the shaft is passed into the notch via its gap at block 1032. The bearing assembly is then moved axially to place its flange neck into the notch at block 1036. The replacement assembly is then latched at block 1040 so that printing with the new platen roll can occur at block 1044. The process ends at block 1048.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

It is claimed:

1. A replaceable printer platen roll system comprising:

a chassis having a first sidewall and a second sidewall, the first and second sidewalls configured to support, in an interior therebetween, opposed, projecting distal ends of a shaft affixed coaxially to a radially extending cylindrical printer platen roll, the chassis configured to receive and support a first outer race of a first bearing on an interior side of the first sidewall, the first bearing having a first inner race configured to axially receive and rotatably support a first distal end of the shaft;

a flange assembly including a flange and a second bearing, the flange having a bore coaxially seating a second outer race of the second bearing, the chassis having a notch in the second sidewall configured to axially receive and seat a neck of the flange, the flange further including an inner lip configured to contact the second sidewall when the neck of the flange is seated in the notch, the second bearing having a second inner race configured to receive and rotatably support a second distal end of the shaft; and a latch configured to selectively engage an outer lip of the flange when the flange is seated in the notch such that the flange is axially removable from the second sidewall when the outer lip is disengaged from the latch.

2. The replaceable printer platen roll system of claim 1 wherein the notch includes a gap configured to allow the shaft to pass therethrough.

3. The replaceable printer platen roll system of claim 2 wherein the flange assembly is configured for axial movement corresponding to an applied axial force so as to be selectively placeable in the notch.

4. The replaceable printer platen roll system of claim 3 wherein the flange assembly is configured such that the second inner race of the second bearing receives the second distal end of the shaft when the flange assembly is placed into the gap.

5. The replaceable printer platen roll system of claim 3 wherein the latch is pivotally secured to the second sidewall.

6. The replaceable printer platen roll system of claim 5 wherein the latch includes a radially projecting latch handle.

7. The replaceable printer platen roll system of claim 6 wherein the latch further includes a projection configured to contact a stop when the latch engages the outer lip of the flange.

8. A replaceable printer platen roll system comprising:

a chassis having a first sidewall and a second sidewall, the first and second sidewalls configured to support, in an interior therebetween, opposed, projecting distal ends of a shaft affixed coaxially to a radially extending cylindrical printer platen roll, the chassis configured to receive and support an outer race of a first bearing on an interior side of the first sidewall, the first bearing having a first inner race configured to axially receive and rotatably support a first distal end of the shaft;

a follower gear affixed coaxially to a second distal end of the shaft;

a flange assembly including a flange and a second bearing, the chassis having a notch in the second sidewall configured to axially receive and seat a neck of the flange, the flange assembly further including an inner lip portion configured to contact the second sidewall when the neck of the flange is seated in the notch, the second bearing having a second inner race configured to receive and rotatably support the second distal end of the shaft; and a latch configured to selectively engage an outer lip portion of the flange when the flange is seated in the notch such that the flange is axially removable from the second sidewall when an outer lip thereof is disengaged from the latch, the follower gear configured to engage a drive gear when the latch is engaged.

9. The replaceable printer platen roll system of claim 8 wherein the notch includes a gap configured to allow the shaft to pass therethrough.

10. The replaceable printer platen roll system of claim 9 wherein the flange assembly is configured for axial movement corresponding to an applied axial force so as to be selectively placeable in the notch.

11. The replaceable printer platen roll system of claim 10 wherein the flange assembly is configured such that the second inner race of the second bearing receives the second distal end of the shaft when the flange assembly is placed into the gap.

12. The replaceable printer platen roll system of claim 10 wherein the latch is pivotally secured to the second sidewall.

13. The replaceable printer platen roll system of claim 12 wherein the latch includes a radially projecting latch handle.

14. The replaceable printer platen roll system of claim 13 wherein the latch further includes a projection configured to contact a stop when the latch engages the outer lip of the flange.

15. A method for changing a platen roll comprising:

locating, within a printer, a mounted platen roll assembly, the mounted platen roll assembly including a shaft supporting a coaxially mounted platen roll, the shaft having a first distal end in rotatable contact with a first bearing affixed to a first support, and a flange assembly having a second bearing in a bore thereof, the second bearing having an inner race coaxially secured to a second distal end of the shaft, the flange assembly secured from radial movement by contact between an interior of a crescent notch in a second support and a neck of a flange, and the flange assembly secured from axial movement within the crescent notch by contact between a latch secured to the second support and a lip of the flange assembly;

operating the latch to unlatch the flange from the second support; and unmounting the mounted platen roll assembly from the printer by sliding it axially so as to remove the flange assembly from the crescent notch and expose the shaft to the interior of the crescent notch, passing the exposed shaft through an opening of the crescent notch and removing the first distal end of the shaft from contact with the first bearing.

16. The method of claim 15 further comprising:

obtaining a replacement platen roll assembly; and mounting the replacement platen roll assembly to the printer by placing a first distal end of a replacement shaft of the replacement platen roll assembly in rotatable contact with the first bearing, passing an exposed portion of the replacement shaft of the replacement platen roll assembly through the opening of the crescent notch, securing the replacement platen roll assembly from radial movement by placing a neck of a flange of a replacement roll assembly in the crescent notch such that the neck thereof contacts the interior of the crescent notch, and securing the replacement platen roll assembly by operating the latch to secure a lip of the flange of the replacement roll assembly to the second support.

17. The method of claim 16 wherein the latch is pivotally mounted to the second support.

18. The method of claim 17 wherein operating the latch includes rotating the latch in a first direction to secure and rotating the latch in a second direction to unlatch.

19. The method of claim 18 further comprising contacting a stop to prevent further rotation of the latch when it is placed a latched position.

20. The method of claim 19 further comprising performing a print operation in conjunction with operation of the replacement platen roll assembly.

* * * * *